United States Patent Office 3,594,344
Patented July 20, 1971

3,594,344
STABLE AQUEOUS EMULSIONS OF ALKYL ACRYLATE-GLYCIDYL METHACRYLATE ENGRAFTED N-VINYL
Eugene S. Barabas, Watchung, and Frederick Grosser, Midland Park, N.J., assignors to GAF Corporation, New York, N.Y.
No Drawing. Continuation-in-part of abandoned application Ser. No. 595,027, Nov. 17, 1966. This application May 22, 1969, Ser. No. 827,040
Int. Cl. C08f 7/14
U.S. Cl. 260—29.6                              10 Claims

ABSTRACT OF THE DISCLOSURE

Water-insoluble grafted terpolymers of a polymeric N-vinyl lactam, such as polyvinyl pyrrolidone, with an alkyl acrylate and glycidyl methacrylate, are prepared as stable aqueous emulsions.

---

This is a continuation-in-part of our copending application, Ser. No. 595,027, filed Nov. 17, 1966, and now abandoned.

The present invention relates to stable, aqueous emulsions comprising a grafted polymeric N-vinyl lactam containing an alkyl acrylate and glycidyl methacrylate.

Grafted polymers comprising a basic homopolymer chain containing grafted thereon units or a plurality of such units of one or more polymerizable monomers, in chain form, grafted onto the basic homopolymer chain represent an interesting and important development in the resin arts, particularly since such grafted polymers find immediate and practical utility for the resin chemist to utilize them as "building block" resin systems or "module" resin systems which can be employed to "tailer-make" subsequent resin systems to suit specific industrial needs. Grafted copolymers can be made by a variety of polymerization methods including solution, emulsion or bulk polymerization and the like. In the case of polymeric N-vinyl lactams, and particularly polyvinyl pyrrolidone, their use has been limited to a great extent to those fields of utility which take advantage of the inherent physical characteristics of polyvinyl pyrrolidone, the most important of which is its water solubility. While this physical characteristic of water solubility has projected polyvinyl pyrrolidone into a position of prominence for such industrial applications as pharmaceutical, cosmetic, textile, lithographic uses, it conversely precluded their use in industrial application where water-insolubility of the resin system is a prerequisite.

Accordingly, it is an object of this invention to provide water-insoluble compositions based on polymeric N-vinyl lactams.

Another object of this invention resides in the provision of stable aqueous emulsions of N-vinyl lactams.

Yet another object of this invention resides in the provision of stable aqueous emulsions comprising a grafted polymeric N-vinyl lactam containing alkylacrylates and glycidyl methacrylate.

Other objects of the invention will become further apparent as the description of the invention proceeds.

In accordance with the above-defined objects, methods have been devised whereby stable aqueous emulsion latices are provided comprising N-vinyl lactam containing an alkylacrylate and glycidyl methacrylate.

As a result of the invention upon which the present discovery is based, the latices of the present invention find immediate and practical applicability for use as cast films which are transparent, colorless and flexible. The films which are deposited are strong and clear and can be produced directly upon evaporation at room temperatures and are therefore important in hairspray compositions. Such materials are eminently useful as protective coatings, impregnants and permanent sizing agents for paper, leather and the like. Still other useful applications of the emulsions of the invention include their use as pastes or dispersions in hot dip coating, slush casting and cellular elastomer applications.

The polymeric N-vinyl lactams utilized in the preparation of the compositions of this invention are characterized by the following general structural formula:

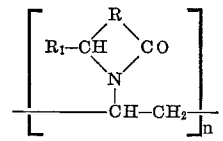

wherein R represents an alkylene bridge group necessary to complete a 5, 6 or 7-membered heterocyclic ring system, $R_1$ represents either hydrogen or an alkyl group, and $n$ represents a number indicative of the extent of polymerization.

All of the specific polymeric materials characterized by the foregoing general formula are commercially available and called polymeric N-vinyl lactams. They are obtained by polymerizing organic 5, 6 or 7-membered ring compounds containing in their rings the —NH—CO-group, such as, for example, 1-vinyl-2-pyrrolidone, 1-vinyl - 5 - methyl - 2 - pyrrolidone, 1-vinyl-2-piperidone, N-vinyl-ε-caprolactam, and the like. Depending upon the extent of polymerization polymers having molecular weights ranging from at least 400 up to 2,000,000 or more may be produced. Viscosity measurements are commonly used as an indication of the average molecular weight of polymeric compositions, the instant polymers being characterized by a chain of carbon atoms to which the lactam rings are attached through their nitrogen atoms:

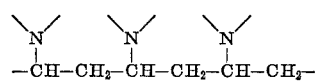

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\frac{\log_{10} \eta_{\text{rel}}}{C} = \frac{75k^3}{1+1.5kC} + k$$

wherein C is the concentration in grams per hundred cc. of polymer solution and $\eta_{\text{rel}}$ is the ratio of the viscosity of the solution to that of pure solvent. The K values are reported as 1000 times the calculated viscosity coefficient in order to avoid the use of decimals. For the purpose of the present invention there may be employed those polymeric N-vinyl lactams having a K value of about 10 to 200, preferably of 30 to 100 because of their viscosity at lower concentrations.

K values and specific viscosities ($\eta_{\text{sp}}$) are interconvertible and are related through relative viscosity ($\eta_{\text{rel}}$). Thus, when viscosity measurements are taken on solutions which have a concentration of 1.00 gram of polymer per deciliter of solution at 25° C. (c.=1), the relationships are as follows:

$$\eta_{\text{rel}} = \eta_{\text{sp}} + 1$$

Relative viscosity=specific viscosity plus one.

Relative viscosity $= 10[0.001K + 0.000075K^2/(1+0015K)]$

Hence, $$\eta_{\text{sp}} = -1 + 10[0.001K + 0.000075K^2/(1+0.0015K)]$$

Relative viscosity, specific viscosity and K are dimensionless, whereas inherent viscosity $$\frac{(\log_e \eta_{\text{rel}})}{C}$$

and intrinsic viscosity (the limit of inherent viscosity as C approaches zero) have the dimensions of dilution, i.e., the reciprocal of concentration. Instrinsic viscosity and K are intended to be independent of concentration.

The number of recurring polymer units enclosed by brackets in the foregoing general structural formula, indicated by $n$, or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in United States Pats. 2,265,450; 2,317,804; and 2,335,454 and in which working examples of all the species characterized by the above formula are given and all of which are incorporated herein by reference to said patents.

While not wishing to be bound by any particular theory or mechanism of reaction, it is believed that the arrangement of the monomeric units, that is, the alkylacrylate and glycidyl methacrylate monomers, is an essential part of the invention in relation to the polymeric N-vinyl lactam. With respect to the terpolymers of the present invention, the units of alkylacrylate and glycidyl methacrylate are not situated in the main polymer chain but rather they form a more or less alternating side chain on the preformed polyvinyl pyrrolidone which forms the skeletal chain for the addition of the alkylacrylate and glycidyl methacrylate units. The ratio (by weight) of the polymeric N-vinyllactam and the comonomers can be 10/90 to 99/1. The ratio of alkylacrylate and glycidyl methacrylate can be 99/1 to 1/99. In a most preferred embodiment, the products contain not more than about 60% polymeric N-vinyl lactam and at least 40% of the mixed alkylacrylate/glycidyl methacrylate monomers since too large amounts of the lactam increase the brittleness of the product. Also, preferred products are those containing no more than about 1 part by weight of glycidyl methacrylate to 2 parts by weight of the alkylacrylate.

For the preparation of the emulsions of our invention, the polymerizations must be carried out in aqueous dispersion, in the presence preferably of a water-soluble initiator such as potassium persulfate, ammonium persulfate, similar initiators or other known free radicals, or by use of high energy radiation (X-rays, gamma-rays) and advantageously also in the presence of a surface-active agent. The preferred practice is to first prepare an aqueous solution containing the polymeric vinyl lactam, the initiator and the surface active agent, heat the solution to the desired temperature, and then add the monomers in admixture dropwise to the reaction mixture, or add separately dropwise and at such rate that the respective monomers are completely added at the end of any stated time period. The reaction is preferably carried out in the absence of free oxygen and most preferably under a blanket of neutral gas (e.g. nitrogen, argon, etc.). After completion of the addition of all of the monomers, the reaction mixture is then heated for a period up to several hours or more on a steam bath. Preferred reaction temperatures range from 50–95° C. and most preferably from 65–75° C. to avoid violent reactivity and undesirable side reaction. The resulting stable aqueous emulsion contains the resinous interpolymers, above-defined, in the form of small particles or beads measuring in diameter about from 100 to 300 millimicrons. If desired, an activating agent such as an alkali metal sulfite or bisulfite, e.g., sodium, potassium, etc., sulfites and metabisulfites can be added to the polymerization reaction mixture in about the same amount as the polymerization initiator in which case lower polymerization temperatures may be used. Chain regulators such as hexyl, cetyl, dodecyl, myristyl, etc., mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e.g., sodium isobutylnapthalene sulfonate, etc., phosphate esters of polyethoxy alkylphenols sulfosuccinic esters, γ-stearaminopropyl, dimethyl β-hydroxyethyl ammonium chloride, and the like.

The emulsions can be compounded with additives such as pigments, salts, wetting agents, resins, waxes and the like, thus providing a wide spectrum of products having wide industrial application.

The alkyl acrylates which are employed in the invention are those alkyl esters of acrylic acid wherein the alkyl portion contains about one to about twelve carbon atoms. The alkyl chain may be straight- or branch-chained. Particularly preferred compounds falling within this class are ethylacrylate, n-propyl acrylate, n-butyl acrylate, 2-ethylhexyl acrylate, lauryl acrylate and the like. Mixtures of these acrylates may also be employed. These compounds are well known to the art.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

The following examples will serve to illustrate the practice of the invention:

EXAMPLE I

Into a four-necked, one liter resin kettle equipped with a mechanical stirrer, thermometer for liquid temperature, dropping funnel, reflux condenser, gas inlet tube and sampling tube were placed water, polyvinyl pyrrolidone, Duponol-ME (sodium lauryl sulfate) and ammonium persulfate in the amounts reflected in Table I (attached) and maintained at a temperature of 100° C. Subsequently, ethylacrylate and glycidyl methacrylate monomer were added dropwise over the time increments indicated in Table I, as well as subsequent additions of ammonium persulfate.

Solution A was charged to the kettle, agitation was started, the system was purged thoroughly with nitrogen, and the solution was heated to 60° C. At this point 2.0 grams of

TABLE I

| | Amount | | Seed., ml. | Ml. of ingredients added at— Hours of reaction | | | | | | | | |
|---|---|---|---|---|---|---|---|---|---|---|---|---|
| Ingredients | Gm. | Ml. | | 0 hr. | ½ hr. | 1 hr. | 1½ hrs. | 2 hrs. | 2½ hrs. | 3½ hrs. | 5 hrs. | 24 hrs. |
| Water | 300.6 | 221.6 | ¹ 217.6 | | | | | | 2.0 | 2.0 | | |
| PVP/K-30 | 60.0 | | (⁴) | | | | | | | | | |
| Ethylacrylate | 126.0 | 136.2 | | } | 49.0 | | 48.8 | | 48.8 | | | |
| Glycidyl methacrylate | 14.0 | 10.4 | | | | | | | | | | |
| Duponol ME | 3.0 | ² 30.0 | 30.0 | | | | | | | | | |
| (NH₄)₂S₂O₈ | 0.52 | ² 52.0 | | | ³ 52.0 | | | | | | | |
| (NH₄)₂S₂O₈ | 0.09 | ² 9.0 | | | | | | | | 3.0 | 3.0 | 3.0 |
| Temperature, °C | | | 25 | 100 | | | 85 | | | | 65 | |

¹ The amount of water used for making the solutions is deducted.
² Solution in water.
³ Added at 60° C.
⁴ 60.0 g.
Analytical results:
  Solids (percent)=40.0.
  Conversion (percent)=100.0.
  Brookfield visc. (cps.)=183.0.

EXAMPLE II

Apparatus.—2 liter resin kettle equipped with mechanical stirrer, reflux condenser, thermometer, gas inlet tube, and dropping funnel.

Procedure.—Distilled water (890 grams) was placed in the resin kettle, 334 grams poly (N-vinyl-2-pyrrolidone) (K-30), 6 grams Igepal CO-630 and 3 grams sodium acetate were added, and the mixture was stirred until a clear solution was obtained. The system was thoroughly purged with nitrogen, then the content of the kettle was heated to 60° C. At this point 2.2 grams of ammonium persulfate was introduced and heating was continued until 100° C. was reached. This temperature was held for 30 minutes. After that the temperature was lowered to 65° C. and 22 grams of a 5% ammonium persulfate solution was added. The temperature was then raised to 70° C. Butyl acrylate (334.8 grams), 50.4 grams glycidylmethacrylate, 6 grams Igepal CO-630, and 6 grams Santomerse-3 paste were thoroughly mixed and placed in a dropping funnel. This mixture was then added, dropwise over two hours at 70° C., using intermittent cooling to maintain the temperature. After all the monomer had been added, the mixture was held at 70° C. for two more hours, and then was discharged through cheesecloth.

Analysis:
  Solids: 43.69%
  Residual Monomer: 0.21% (determined as VP)
  Crud: slight amount
  Brookfield viscosity: 6,400 cps.
  pH: 4.1

EXAMPLE III

Apparatus.—As described in Example II, with a second dropping funnel for the addition of catalyst.

Charge
A:
  391.0 grams distilled water
  80.0 grams poly (N-vinyl-2-pyrrolidone)-K-30
B:
  200.0 grams Igepal CO-630-10% solution
  20.0 grams sodium acetate-10% solution
  2.0 grams ammonium persulfate
  4.0 grams ammonium persulfate-5% solution
C:
  320.0 grams butylacrylate
  16.0 grams glycidyl methacrylate
  8.0 grams Igepal CO-630
D:
  80.0 grams distilled water
  0.2 gram ammonium persulfate ammonium persulfate was introduced, and heating was continued until 100° C. was reached. This temperature was held for 30 minutes. After that, cooling was applied and the temperature was lowered to 60° C., whereupon Solution B was introduced. After that, 86 grams of Solution C was added and the temperature was raised to 70° C. At this temperature 4.0 grams of a 5% ammonium persulfate was added, and the mixture was agitated at 70° C. for 30 minutes. The rest of Solution C, together with Solution D, were then added over a 90 minute period. After the completion of the addition, the mixture was maintained at 70° C. for two more hours, then cooled to room temperature and discharged through a cheesecloth.

Analysis:
  Solids: 39.91%
  Residual monomer: 0.07% (determined as VP)
  Crud: Trace
  Brookfield viscosity: 425 cps.
  pH: 3.7

EXAMPLE IV

Apparatus.—Similar to that described in Example II.
Procedure.—As described in Example II with the exception that the comonomer mixture consisted of 160 grams 2-ethylhexyl acrylate, 160 grams ethylacrylate and 12 grams glycidyl methacrylate.

Analysis:
  Solids: 40.90%
  Residual monomer: 0.24%
  Crud: Nil
  Brookfield viscosity: 120 cps.
  pH: 5.0
  Technical stability: OK

EXAMPLE V

Apparatus.—2 l. kettle equipped with mechanical stirrer, reflux condenser, gas inlet tube, thermometer and dropping funnel.

Procedure.—Distilled water (646 parts) was placed in the kettle, 80 parts polyvinyl pyrrolidone (K-30), 20 parts Igepal CO-630, and 2 parts sodium acetate were added, and the mixture was stirred until clear solution was obtained. The system was purged thoroughly with nitrogen and the temperature was raised to 60° C. At this point 2 parts of ammonium persulfate was added and the temperature was raised to 100° C. This temperature was maintained for 30 minutes. The temperature was then lowered to 60° C. At this point ⅓ of a mixture made up of 320 parts 2-ethylhexyl acrylate, 12 parts glycidyl methacrylate, and 20 parts Igepal CO-630, were added. The mixture was heated to 70° C. and this temperature was held for 30 minutes. After that, the addition of the remaining ⅔ was started and it was added in 2 hours. The mixture was agitated at 70° C. until practically full conversion was obtained.

Analysis:
Solids: 41.67%
Residual monomer: 0.29%
Crud: Slight trace
Brookfield viscosity: 210 cps.
pH: 5.2
Technical stability: OK [1]

[1] No coagulation during a 10 minute treatment in a high speed Waring Blendor.

It will be apparent that in place of the polyvinyl pyrrolidone having a potential K value of 30 employed in the foregoing examples, other polymeric N-vinyl lactams or polyvinyl pyrrolidone having other degrees of polymerization may be employed in practicing the present invention. We particularly prefer the commercially available polymers of N-vinyl-2-pyrrolidone having potential K values of from about K15 to K90 which corresponds to average molecular weights as determined by the Osmometric Method (H. P. Frank and G. B. Levy, J. Polymer Sci. 10, 371 (1953)) of from about 10,000 in the case of PVP K15 to about 360,000 in the case of PVP K90, PVP K30 having an average molecular weight of about 40,000 and PVP K60 having an average molecular weight of about 160,000.

Reference in the specification and claims to parts, proportions and percentages, unless otherwise specified, refer to parts, proportions and percentages by weight.

Since it is obvious that numerous changes and modifications can be made in the above-described details without departing from the spirit and nature of the invention, it is to be understood that all such changes and modifications are included within the scope of the invention and that the invention is not limited to the exemplary details set forth by way of example, except as set forth in the appended claims or as necessitated by the effect of the prior art.

What is claimed is:

1. A stable emulsion comprising water and a graft polymer of alkylacrylates having 1 to 12 carbon atoms in the alkyl portion and glycidyl methacrylate which have been polymerized and grafted onto a polymer of an N-vinyl lactam corresponding to the formula:

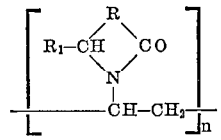

wherein R represents an alkylene bridge group containing from 2 through 4 carbon atoms, $R_1$ represents a member of the group consisting of hydrogen and alkyl and $n$ represents a positive integer selected from the group consisting of 4 through 20,000.

2. The emulsion of claim 1 wherein the ratio of the polymeric N-vinyl lactam to the comonomers is 10/90 to 99/1.

3. The emulsion of claim 2 wherein the ratio of alkylacrylate to glycidyl methacrylate is 1/99 to 99/1.

4. The emulsion of claim 1 wherein the polymeric N-vinyl lactam is polyvinylpyrrolidone.

5. The emulsion of claim 1 wherein mixtures of alkyl acrylates are employed in forming the terpolymer.

6. The emulsion of claim 1 wherein the graft polymer contains not more than about 60% of the polymeric N-vinyl lactam and at least 40% of the mixed alkyl acrylate/glycidyl methacrylate monomers.

7. The emulsion of claim 6 wherein the graft polymer contains about one part glycidyl methacrylate to about 2 parts by weight of alkyl acrylate.

8. The emulsion of claim 1 wherein the alkyl acrylate is selected from the group consisting of ethyl acrylate, butyl acrylate, 2-ethylhexyl acrylate and mixtures thereof.

9. The emulsion of claim 8 wherein the polymeric N-vinyl lactam is polyvinylpyrrolidone.

10. The emulsion of claim 9 wherein the graft polymer contains approximately equal parts by weight of polyvinylpyrrolidone and butyl acrylate, each representing about 46.5% by weight of the total product, with the glycidyl methacrylate making up the remaining 7% by weight.

References Cited

UNITED STATES PATENTS

| | | | |
|---|---|---|---|
| 2,890,199 | 6/1959 | McNulty et al. | 260—45.5 |
| 2,922,768 | 1/1960 | Mino et al. | 260—17.4 |
| 3,214,498 | 10/1965 | Bauer | 260—882 |
| 3,244,658 | 4/1966 | Grosser et al. | 260—29.6 |
| 3,462,385 | 8/1969 | Barabas et al. | 260—29.6 |
| 3,468,832 | 9/1969 | Barabas et al. | 260—29.6 |

HAROLD D. ANDERSEN, Primary Examiner

E. A. NIELSEN, Assistant Examiner

U.S. Cl. X.R.

260—885